United States Patent [19]

Barnes et al.

[11] Patent Number: 4,624,591
[45] Date of Patent: Nov. 25, 1986

[54] IMPACT PRINTER WITH TYPE FONT ELEMENTS HAVING MID-LINE PITCH CHANGE CAPABILITY

[75] Inventors: Johnny G. Barnes; James L. Gaudet, both of Austin, Tex.; Patrick J. Hurley, Delray Beach, Fla.; Grover H. Neuman, Austin, Tex.

[73] Assignee: International Business Machines Corporation, Armonk, N.Y.

[21] Appl. No.: 698,722

[22] Filed: Feb. 5, 1985

Related U.S. Application Data

[63] Continuation of Ser. No. 505,132, Jun. 16, 1983, abandoned.

[51] Int. Cl.[4] ............................. B41J 1/22; B41J 3/58
[52] U.S. Cl. .................................... 400/171; 400/17; 400/144.2; 400/307.2; 400/347; 400/697; 400/904; 364/900
[58] Field of Search ............. 400/10, 17, 61, 74, 400/110, 144.2, 149, 150, 151, 151.1, 171, 174, 175, 279, 293, 294, 296.1, 298, 307.2, 347, 697, 697.1, 904; 364/900; 318/685, 696

[56] References Cited

U.S. PATENT DOCUMENTS

| | | | |
|---|---|---|---|
| 3,540,565 | 11/1970 | Hanft et al. | 400/293 |
| 3,630,336 | 12/1971 | Johnson et al. | 400/17 |
| 3,636,429 | 1/1972 | Jakubowski et al. | 318/685 |
| 3,645,372 | 2/1972 | Noell et al. | 400/171 |
| 3,773,160 | 11/1973 | Rava et al. | 400/697 X |
| 3,780,846 | 12/1973 | Kolpek et al. | 400/697.1 X |
| 3,820,644 | 6/1974 | Yeh | 400/110 |
| 3,892,303 | 7/1975 | Willcox | 400/171 |
| 4,004,675 | 1/1977 | Ludwig | 400/279 X |
| 4,026,403 | 5/1977 | Inose et al. | 400/11 |
| 4,074,798 | 2/1978 | Berger | 400/174 X |
| 4,134,694 | 1/1979 | Stuiber et al. | 400/298 X |
| 4,136,395 | 1/1979 | Kolpek et al. | 400/74 X |
| 4,178,108 | 12/1979 | Kane | 400/144.2 |
| 4,181,444 | 1/1980 | Heider | 400/904 |
| 4,189,246 | 2/1980 | Kane et al. | 400/144.2 |
| 4,217,055 | 8/1980 | Moon | 400/171 X |
| 4,281,938 | 8/1981 | Phillips | 400/171 |
| 4,307,968 | 12/1981 | Habich et al. | 400/144.2 X |
| 4,357,115 | 11/1982 | Or | 400/144.2 |
| 4,397,572 | 8/1983 | Barnes et al. | 400/697 |
| 4,445,194 | 4/1984 | Cason et al. | 364/900 |
| 4,577,288 | 3/1986 | Busch | 364/900 |

FOREIGN PATENT DOCUMENTS

| | | | |
|---|---|---|---|
| 0005774 | 1/1981 | Japan | 400/697 |
| 0084888 | 5/1982 | Japan | 400/174 |
| 0053470 | 3/1983 | Japan | 400/307.2 |

OTHER PUBLICATIONS

IBM Technical Disclosure Bulletin, "Composing Systems which Incorporate Font Changing and Impression Setting from Tape or Card Input," Hunt et al., vol. 13, No. 5, Oct. 1970, pp. 1149–1150.

Primary Examiner—Ernest T. Wright, Jr.
Attorney, Agent, or Firm—J. B. Kraft; Thomas E. Tyson

[57] ABSTRACT

An impact printing system which is particularly suitable for word processing is provided with the capability of effecting mid-line pitch changes. The impact printer system which is particularly compatible with interactive display terminals in word processing system has means for receiving a selected one of a plurality of type or character font elements. The pitch of character font elements are different from each other. The printing system includes means for selectively impacting selected characters from selected fonts along lines in a document. The system further includes control apparatus for controlling and determining the selection of font elements to be used and in the case of printing with a particular font element, the characters to be printed in respective positions along the lines of the document to provide the desired document format. The control apparatus includes apparatus for controlling the printing with at least two different font elements having different pitch along a single line.

13 Claims, 17 Drawing Figures

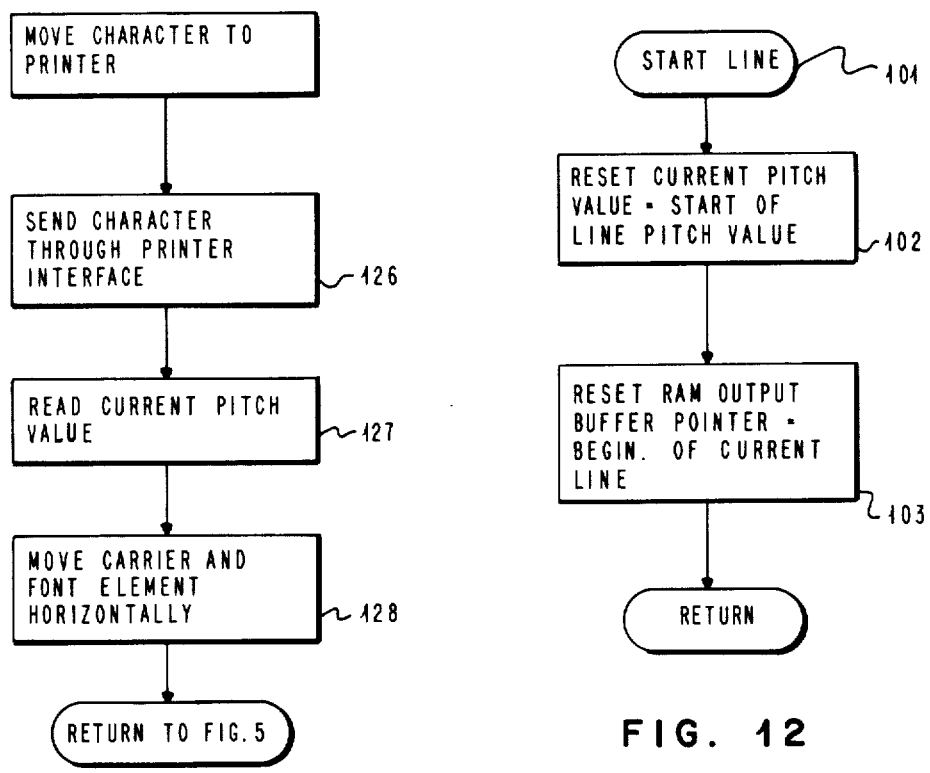
FIG. 11
FIG. 12
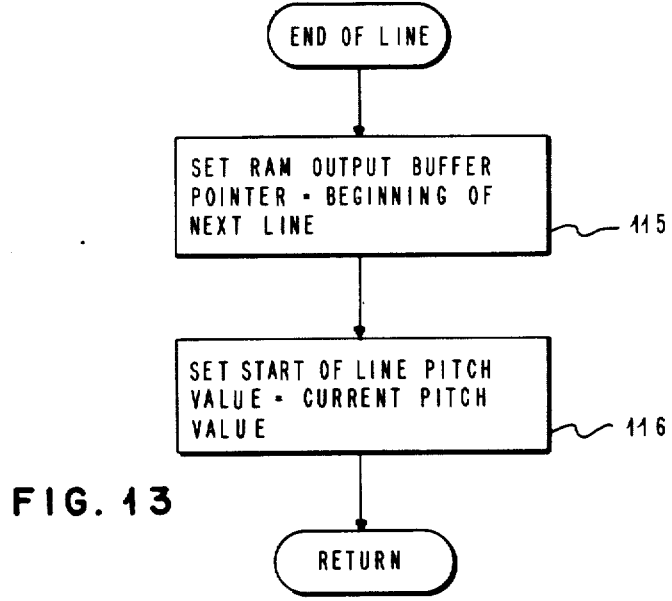
FIG. 13

NOW IS THE TIME

N̸O̸W̸ ̸I̸S̸ ̸T̸H̸E̸ ̸T̸I̸M̸E̸

IMPACT PRINTER WITH TYPE FONT ELEMENTS HAVING MID-LINE PITCH CHANGE CAPABILITY

This application is a continuation of application Ser. No. 505,132, filed June 16, 1983, now abandoned.

DESCRIPTION

TECHNICAL FIELD

The present invention relates to printing systems and particularly to printing systems which are compatible with interactive display terminals to provide word processing systems.

BACKGROUND OF THE INVENTION

Word or text processing systems having interactive display terminals permitting an operator to extensively edit and format alphanumeric data which is, in turn, printed out on an associated printer have been in ever increasing demand in the office products and systems field. A goal of all word processing systems is to facilitate the preparation of such formatted correspondence and other documents by the systems operator. To this end, the industry has been attempting to make the processor as "friendly" and unconfusing to the operator as possible. This of course entails minimizing the operator steps necessary to produce a document and particularly minimizing constraints upon the operator.

Most current word processing systems utilize impact printers having a removable type or character font element mounted upon a carrier which is movable along horizontal lines in the document to be printed in the printer. This removable type font element may be of the ball type used throughout the industry or of the daisy wheel type having a plurality of character petals as described with respect to the printer in U.S. Pat. No. 4,178,108. It is very often the case that in preparing a document, a plurality of type font elements have to be used. Since there are in the order of from 90 to 100 characters on a font element, it is readily seen that changes of the type font element may be required even in the formation of a straightforward piece of correspondence. Portions of the document may require fonts with bold face type, other portions of the document italics fonts and still others symbol fonts to be used in equations.

In conventional practice, where a plurality of fonts have to be used to produce a given document, fonts are changed when a line or a paragraph is completed. This change is accomplished either by a message on an interactive display screen indicating to the operator that the operation of the printer has been inhibited until the operator manually changes from a given font to another selected font. At this point, the printing can be continued. On the other hand, the change of font may be accomplished through the expedient of an automatic font changer associated with the printer. U.S. Pat. No. 4,307,968 gives the details of such an automatic font changer associated with a print wheel type of printer. In the case of such an automatic font changer operation, no operator intervention is necessary; the printer automatically changes fonts in an operation which is transparent to the operator.

With reference to FIG. 17 for the following structural and operational description of font changing apparatus 270, apparatus 270 is utilized for automatically effecting an exchange of print elements in cartridge 300.

A printer frame is made up of sides 264 and 265 secured together by escapement rails 266 and 267 and a top support rail 269. Mounted on escapement rails 266 and 267 is a carrier generally designated by reference numeral 290. Carrier 290 is for carrying a selection motor (not shown) within a carrier 262. Carrier 262 is for in turn carrying print element cartridge 300. Carrier 290 and thus carrier 262 are translated along platen 263 by a lead screw 230.

Top support rail 269 in addition to supporting printer frame sides 264 and 265 is used for supporting hangers 271 and 272. Hangers 271 and 272 carry font changing apparatus 270.

Integral with hangers 271 and 272 are plates 295 and 296. Plates 295 and 296 carry support means (not shown) for drive motor 280, pulleys, 275, 276, 277 and 278, and worm gear brackets 293 and 297. Carried in turn by worm gear brackets 293 and 297 are worm gears 273 and 298. Followers (not shown) connect worm gears 273 and 298 and L-shaped uprights 292 and 294, respectively. Integral with uprights 292 and 294 is an elongated and horizontally disposed rack 291. Rack 291 is vertically oriented, and vertically elevatable and lowerable upon rotation of worm gears 273 and 298. Worm gates 273 and 298 are rotatable by motor 280 through pulleys 275, 276, 277, and 278 and belts 281, 279 and 274. Belt 281 is looped over the shaft (not shown) of motor 280, and around pulley 278. Belt 279 is looped around pulleys 278 and 277. Belt 274 is looped around pulleys 277, 275, and 276. Worm gears 273 and 298 form shafts for pulleys 276 and 277, respectively.

While there are available print systems which permit changes in font between successive lines, we are not aware of any printing systems providing for changes in font in the course of a single line and particularly when such changes in font results in a change in the pitch of characters printed along this single line. The result is an additional constraint on the operator. In many existing printing systems, formatting selections made by the operator which will result in changes in font during a course of printing a single line are not permitted. In this manner, the system and consequently the operator need not be concerned with whether such changes in fonts produce pitch changes. The prior art has apparently not developed the capability of handling pitch changes which occur in a single line, i.e., printing on the same line with fonts of different pitch. Thus, even if existing equipment would permit font changes, the operator would be bound by the constraint of changing to a font of the same pitch. This would present significant constraints on the operator as well as being a more costly system. For example, suppose that an operator wished to italicize a portion of a single line. Since the regular portion of the line could conceivably be printed with a font having one of three possible pitches, i.e., 10 pitch, 12 pitch and 15 pitch, the printer would then have to inventory italics fonts of 10, 12 and 15 pitch. This would appear to be unnecessarily costly for the equipment to inventory three different font elements for rarely used italics printing.

The printer system of the present invention, provides for the use of different font elements of different pitch in the same line to thereby eliminate the operator constraint limitation as well as the potential costly font element inventories required of systems which cannot accept the use of fonts of different pitch to print a single line.

SUMMARY OF THE PRESENT INVENTION

The present invention provides for an impact printer system with means for receiving a selected one of a plurality of character font elements which font elements differ in pitch. The printer further includes conventional means for moving the font elements with respect to lines on a document being printed upon and selectively impacting selected characters from the respective fonts along the line in the document together with means for controlling the selection of font elements and characters to provide a preselected document format. The control means further include means for controlling printing with at least two font elements of different pitch along a single line.

In order to accommodate font elements of different pitch along a single line, the printer system preferably includes means for setting tab stops along the print line so that each of the tab stops is at a fixed linear distance from the selected margin in the document. The system of the present invention is particularly advantageous in dealing with a printer system wherein the printed line is formed by moving a carrier containing the print element for a plurality of passes across the line. In such an operation, the printer system provides for underlines for selected portions of the printed line formed by impacting an underline character in a sequence of overlapping positions so that the underlining is substantially unaffected by changes in pitch of the characters being underlined.

In addition, the printer system includes means for overstriking a sequence of characters in a selected line by an overstrike character which has a single pitch whereby if the character which is struck over is printed in a different pitch from the overstrike character, there will not be coincidence of overstrike in underlining characters.

BRIEF DESCRIPTION OF THE DRAWING

Referring now to the drawing wherein a preferred embodiment of the invention is illustrated, and wherein like reference numerals are used throughout to designate like parts;

FIG. 11 is a flow chart of the operations involved in moving a character to the printer.

FIG. 12 is a flow chart of the operations involved at the start of a line.

FIG. 13 is a flow chart of the operations involved at the end of a line.

BEST MODE FOR CARRYING OUT THE INVENTION

Figure 1:
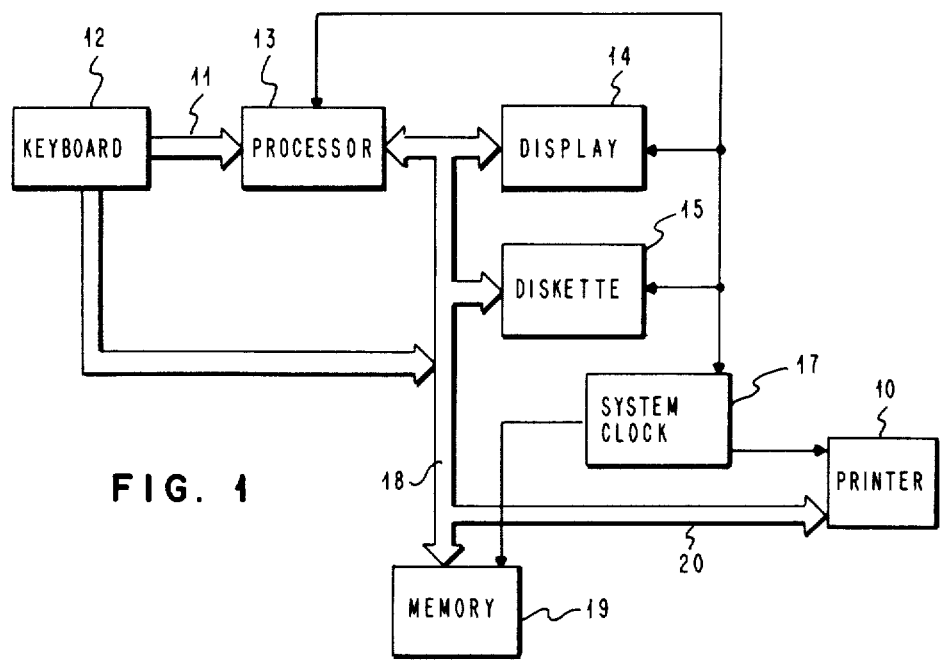
FIG. 1 is a logical block diagram showing the apparatus of the present invention in generalized form.

With reference to FIG. 1, a generalized view of the apparatus which may be used to carry out the present invention is shown. While the present invention may be carried out on a key-to-print type of printer wherein the document is printed in direct response to operator entry at the keyboard, it is preferred that the present printer system be part of a display word processing system. The apparatus for carrying out this invention may be any conventional word or text processing system such as that described in co-pending application Ser. No. 274,050, filed June 16, 1981, now U.S. Pat. No. 4,577,288 issued Mar. 18, 1986, D. G. Busch, "Data Communications System with Receiving Terminal for Varying the Portions of Received Data Being Displayed". In order to carry out the present invention, attached to the text processing system is a conventional printer 10 which may be any printer such as a daisy wheel printer which prints the alphanumeric text on the document to be produced character by character, i.e., in response to the coded representation of the next character to be printed in a particular data stream applied to the printer, a character is selected from the daisy wheel font. A typical print wheel or daisy wheel printer which may be used in accordance with the present invention is described in U.S. Pat. No. 4,189,246.

Figures 14, 15, 16:
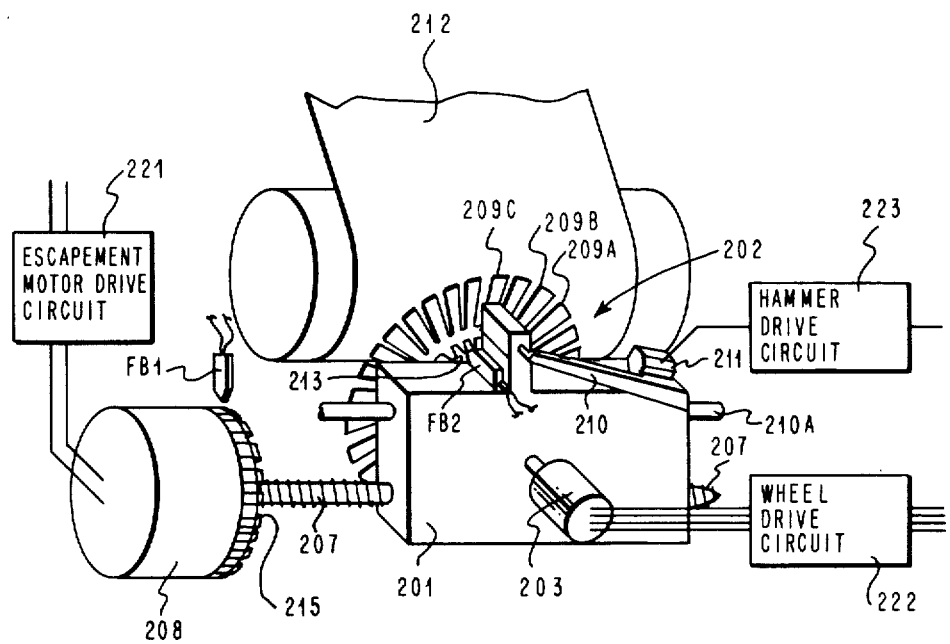
FIG. 14 is an illustration of an underlined line of characters.
FIG. 15 is an illustration of an overstruck line of characters.
FIG. 16 is an illustrative diagram of an impact printer which may be used in the practice of the present invention.
Figure 17:
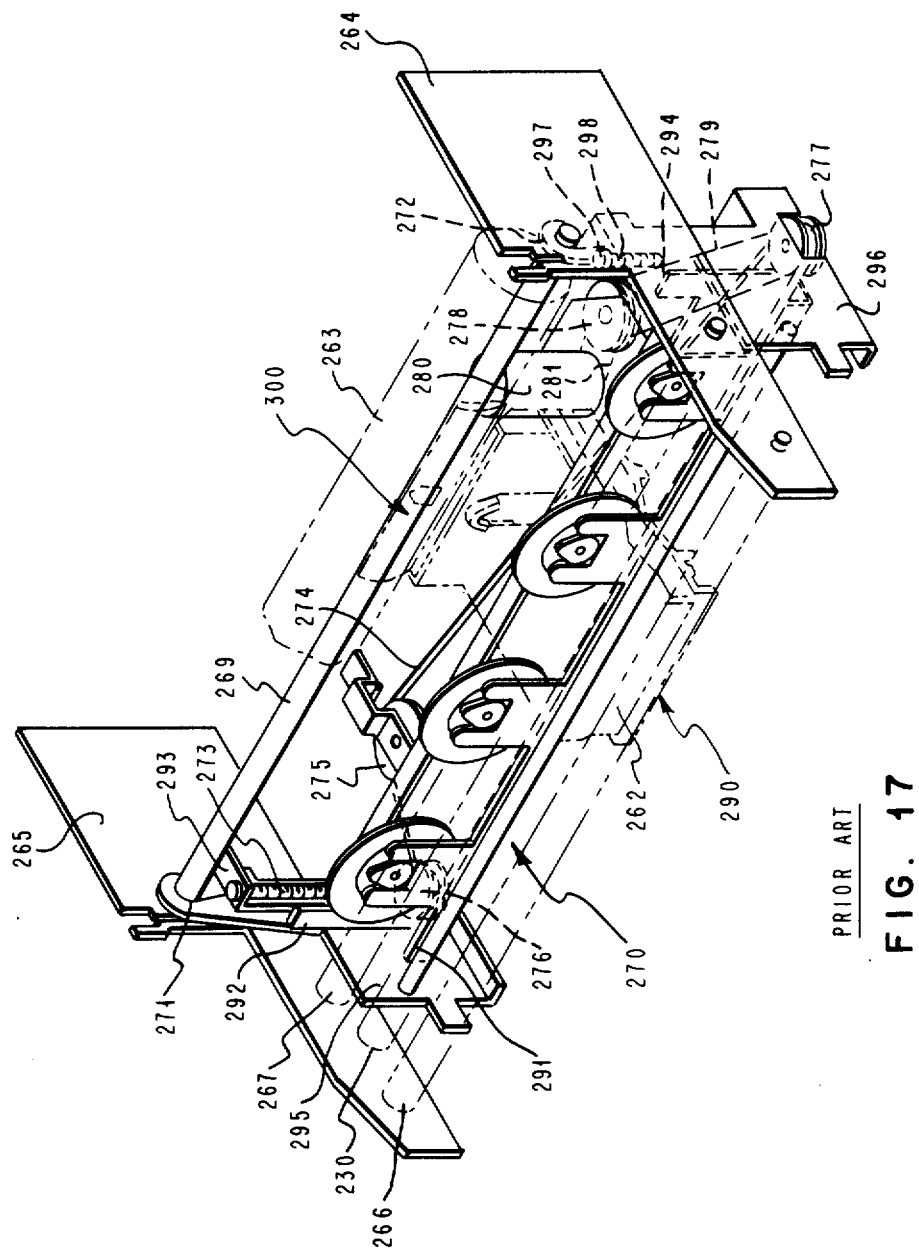
FIG. 17 is an illustrative diagram of an automatic font changer which may be used in the practice of the present invention.

As shown in FIG. 16, a laterally sliding carrier 201 is mounted on a guide rod 201a and a lead screw 207 and carries a rotatable print wheel or type disc 202 driven by a stepping motor 203. The carrier 201 is driven by lead screw 207 which is driven by a stepping motor 208. Alternatively, motor 208 could drive a belt which in turn could drive carrier 201.

A type disc 202 comprises a disk having a number of movable type elements such as the flexible spokes or type fingers 209A, 209B, 209C, etc. Printing of any desired character is brought about by operating a print hammer 210, which is actuated by a solenoid 211, both of which are mounted on carrier 201. When the appropriate type finger approaches the print position, solenoid 211 actuates hammer 210 into contact with the selected type finger, driving it into contact with a paper 212 or other printing medium. An emitter wheel 213 attached to and rotating with type disc 202 cooperates with a magnetic sensor FB2 to produce a stream of emitter index pulses for controlling the operation of the printer. The emitter wheel 213 has a series of teeth each of which correspond to one finger 209A, 209B, 209C, etc. A homing pulse is generated for each revolution of the print wheel 202 by a single tooth on another emitter (not shown). The printer controls can thus determine the angular position of type disc 202 at any time by counting the pulses received since the last homing pulse. A toothed emitter 215 is mounted on the lead screw 207 of the motor 208 and in conjunction with a transducer FB1 provides pulses which indicate the position of the carrier 201.

Stepper motors 203 and 208 are activated by conventional drive circuits 222 and 221. Examples of the type of drive circuitry that could be used are shown in U.S. Pat. No. 3,636,429. A hammer solenoid 211 is actuated by a hammer drive circuit 223 which is also conventional.

The actions of positioning the carrier 201 and positioning the print wheel 202 are, in general, independent except that coordination is required at the instant printing occurs. Both type disc 202 and carrier 201 must be in a selected position (but they need not be at rest) when hammer 210 strikes type disc 202.

In performing the operations to be subsequently described, the operator accesses the word processor through a keyboard 12. The keyboard 12 drives an internal microprocessor 13 which is operably connected to the display terminal 14 as well as to diskette storage means 15. The keyboard 12 is further connected to a randon access memory 19 through memory bus 18. A system clock 17 is provided for timing functions within the word processing system. Printer 10 is communicated with overbus 20. Memory 19 provides means for storing data within the word processing system and also provides the programs for controlling printer 10 to print data and to provide the operator interface through display 14.

Figure 2:
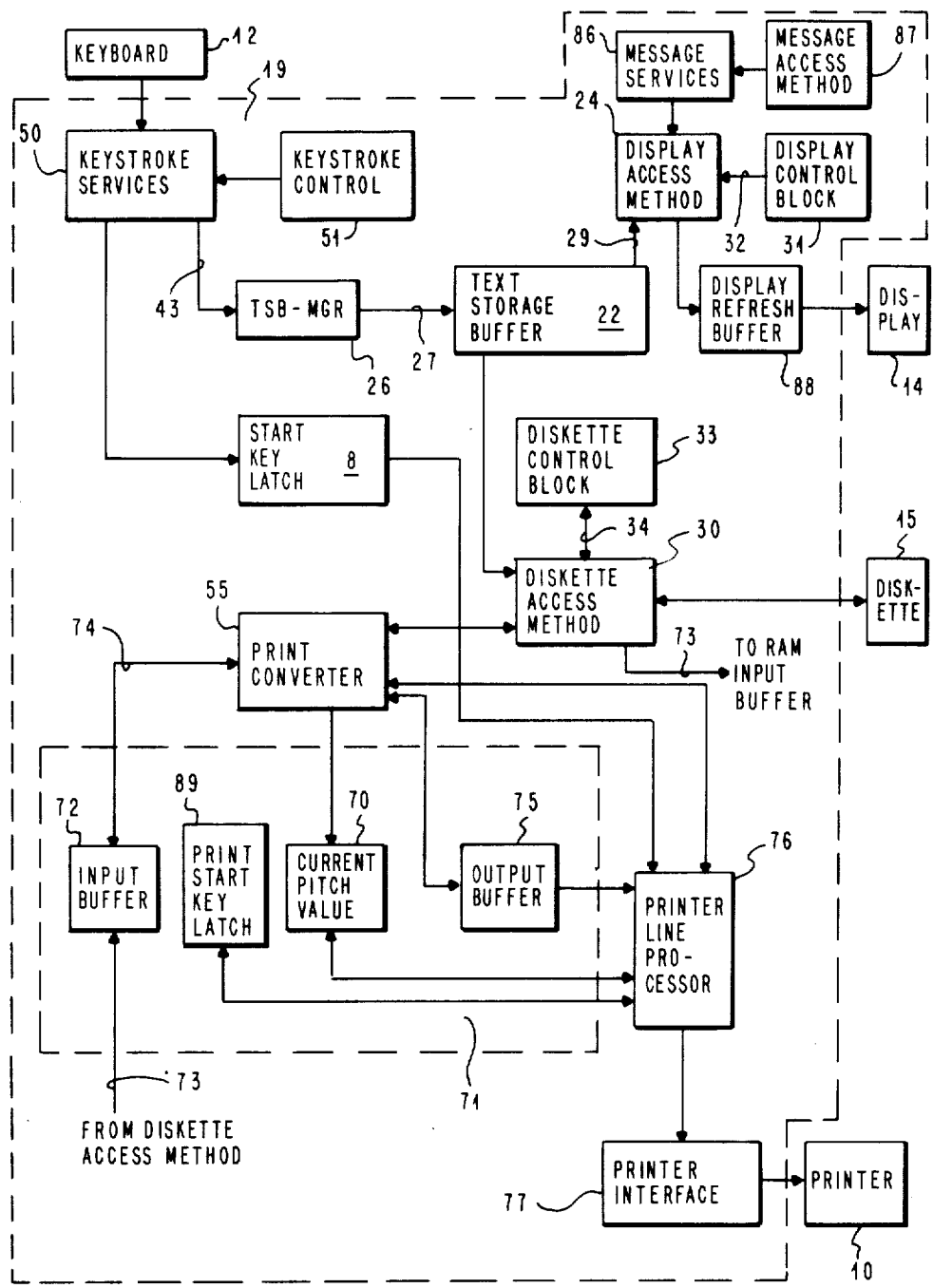
FIG. 2 is a logical block diagram showing the apparatus, particularly in the memory portion of FIG. 1 in greater detail so that the steps involved in the present invention may be understood.

FIG. 2 shows the elements of memory 19 pertinent to the present embodiment and particularly the functional programs which relate to the printing of lines of characters in an operation involving several passes per printed line as will be hereinafter described in greater detail. This printing system will support changes in pitch within a single line. With respect to the pertinent logic operation program for controlling the general operations of the functional areas of memory 19 shown in FIG. 2, the operator interfaces with the display 14 through keyboard 12 involving standard keyboard entry steps. As the operator enters each key stroke at the keyboard 12, a corresponding signal is transmitted through channel 11 to processor 13 which enters the key stroke command into the memory 19 (FIG. 1). In the memory 19, upon the receipt of a key stroke command, a key stroke routine is produced for key stroke service routine block 50 (FIG. 2) to handle the particular command received. This is carried out under the control of the key stroke control block 51. The key stroke command is then processed via channel 43 to the text storage buffer manager block (TSB MGR) 26 which has been programmed to control various processes with respect to the data stored in the text storage buffer 22. The handling and updating of data stored in the text storage buffer 22 is controlled by routines stored within the text storage buffer manager block (TSB MGR) 26. Display access method program block 24 controls the formatting of alphanumeric text representative of the data stored in the text storage buffer 22 on visual display terminal 14 through display refresh buffer 88. It should be noted that the display refresh buffer 88 may operate in any conventional manner. However, in the present example, a "BUILD" subroutine is used which is described in copending U.S. patent application Ser. No. 208,568, filed Nov. 20, 1980, W. C. Cason et al, now U.S. Pat. No. 4,445,194 issued Apr. 24, 1984.

Text storage buffer (TSB MGR) manager block 26 is connected to text storage buffer 22 by line 27. Data representative of the alphanumeric text characters is input into buffer 22. The data representative of characters is stored sequentially in text storage buffer 22 in the order in which it is received. In displaying the characters, text character data stored in buffer 22 is communicated to display access method program block 24 over channel 29. It should be noted that corresponding diskette access method program block 30 is used instead of access method program block 24 when communication between the text storage buffer 22 and the diskette 15 is desired. A display control block 31 is connected through a channel 32 with display access method program block 24. The corresponding diskette control block 33 communicates with diskette access method block 30 over channel 34 when access to the diskette drive is required.

The printer system in the present invention includes print converter 55 which serves as an interface between the data stream of the alphanumeric data to be printed which is stored on diskette 15 and printer 10. The primary function of the converter 55 is to convert the data stream internal to the word processing system as stored on diskette 15 and to access through diskette access method block 30 a printable data stream. The printer system has a supporting random access memory 71 which contains an input buffer 72. This input buffer 72 receives the data stream stored on diskette 15 through diskette access method block 30 via channel 73. Converter 55 takes the data from input buffer 72 via channel 74 and provides the revised or print level data stream to output buffer 75 of RAM 71. This revised or print level data stream which includes codes representative of font changes (which may or may not involve pitch changes) is accessed from output buffer 75 by printer line processor unit 76 which will be described in greater detail hereinafter with respect to FIG. 3. The processed data stream then proceeds through printer interface 77 to printer 10.

Using the apparatus and standard logic described hereinabove with respect to FIGS. 1 and 2 as well as the logic of FIG. 3 and the programming functions to be hereinafter described, the operation of the present invention will now be described in the steps set forth in the flow charts of FIGS. 4-13. At this point, let us assume that the operator at keyboard 12 working with display terminal 14 in a word processing system of the type described above has formatted the document to be printed and that formatted document is currently stored on a diskette 15. In order to commence printing, the operator initiates the printing operation and the data stream representative of the document to be printed is accessed through display access method block 30 (FIG. 2) to input buffer 72 of RAM 71. The data stream then will proceed as previously described through print converter 55 to output buffer 75 of RAM 71 and then onto printer line processor unit 76 which will be involved in most of the operational steps to be described with respect to FIGS. 4-13. Let us further assume that in formatting the document to be printed, the operator has had the occasion to use a plurality of print wheels and consequently has indicated print wheel changes which have become encoded into the data stream; some of these print wheel changes will involve a change in pitch and particularly a change in pitch which occurs during the printing of a line rather than at the end of a line.

Referring first to the flow chart in FIG. 12, under the direction of printer line processor unit 76, at the start of every line, step 101, current pitch value in register 70, RAM 71 in FIG. 2 is reset to start of line pitch value, step 102; also, step 103, the output buffer 75, FIG. 2 is reset to "start of current line", and the start line routine is then completed.

In our illustrative example, we are dealing with an operation wherein each line is formed by up to five passes. The first pass involves the printing of superscript if any is possible. Of course, if no superscript is possible, this pass is unnecessary. The second pass is referred to as the base pass. This is the pass when the actual alphanumeric characters are printed. A third pass is provided for overstriking if any overstriking is present in the line such as the overstriking shown in FIG. 15. A fourth pass is provided for underlining where present such as the underlining in FIG. 14. And a fifth pass is provided for subscript where present. The determination of how many of these passes is to be carried out is made in printer line processor unit 76 and particularly in the line state decoder 78 shown in FIG. 3.

Figure 3:
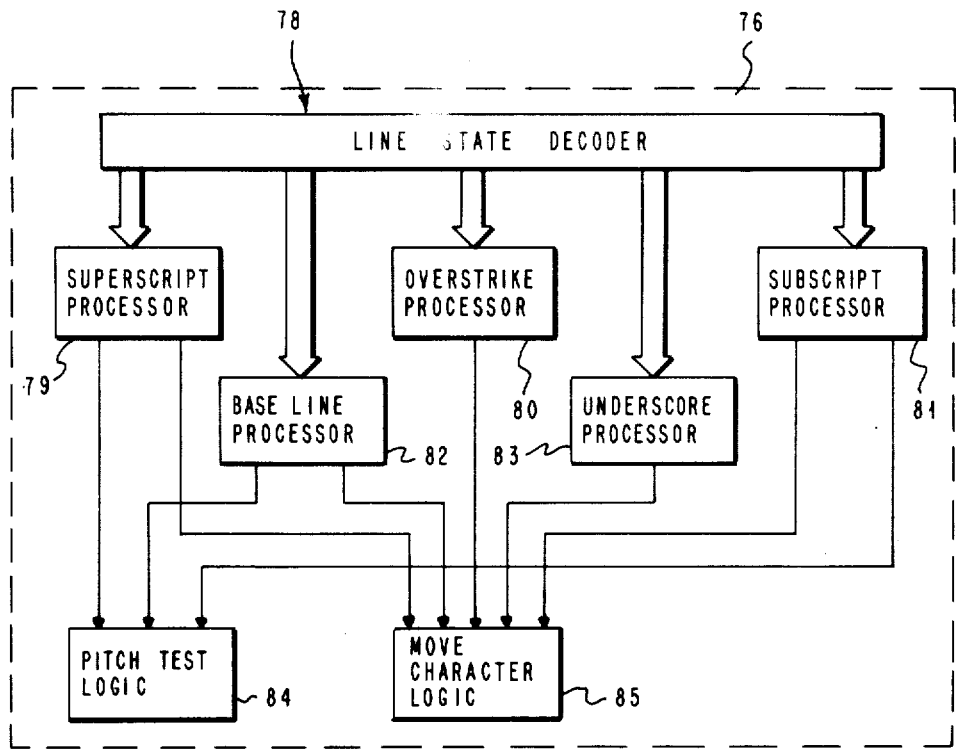
FIG. 3 is a logical block diagram showing a portion of the printer line processor logic of FIG. 2 in greater detail.
Figure 4:
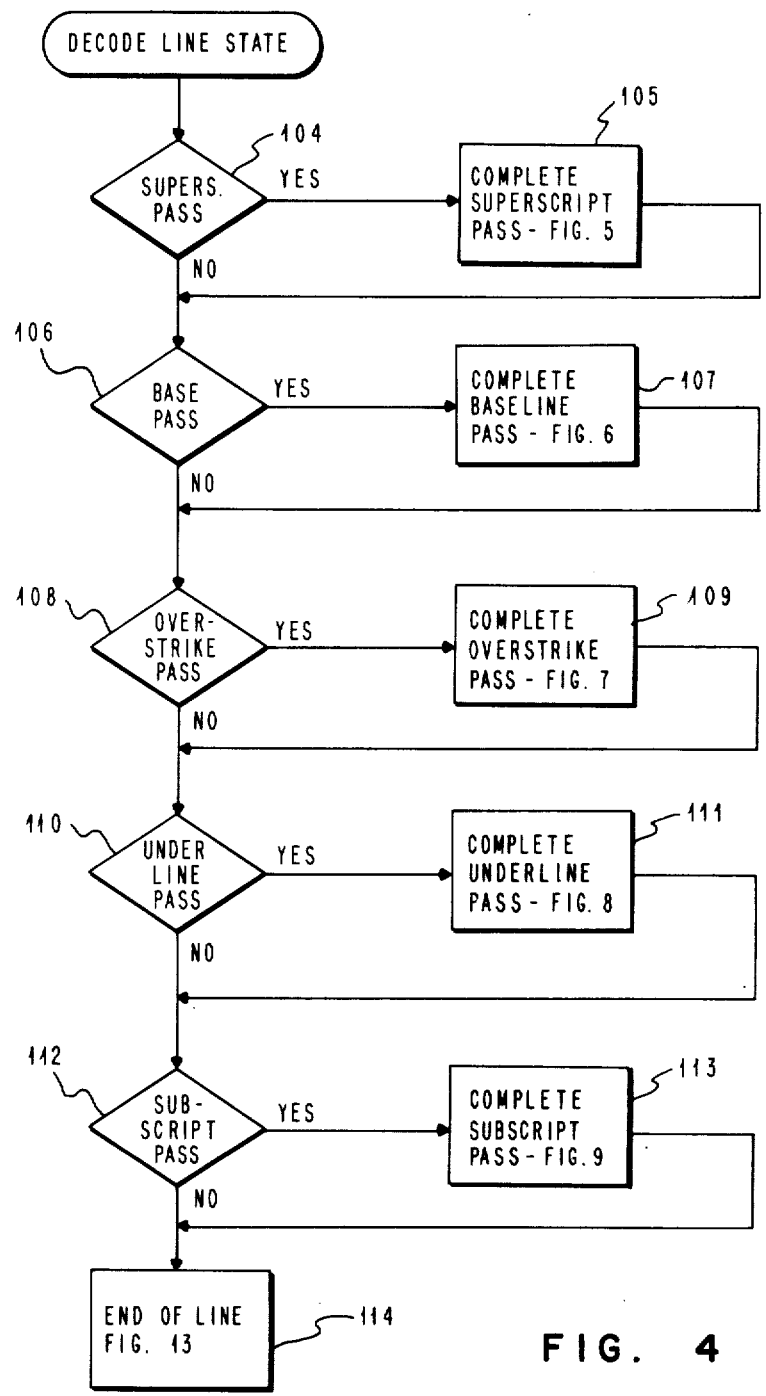
FIG. 4 is a flow chart of the operations involved in the line state decoder of FIG. 3 in order to determine which pass of five possible passes may be available to print the line that the apparatus is currently printing.

The decisions made in the line state decoder 78 of FIG. 3 are made in accordance with the operation to be now described with respect to the flow chart of FIG. 4. First, step 104, a determination is made as to whether there is any superscript to be printed and consequently a superscript pass required. If a superscript pass is required, the process then goes to step 105; the operation will be subsequently described with respect to FIG. 5 necessary to complete a superscript pass. On the other hand, if there is no superscript pass or if the superscript pass is completed, the operation proceeds to decision step 106 wherein the determination is made as to whether a base pass is required. Since the base or base line pass is the pass in which the alphanumeric characters are printed, the base line pass is very likely to be required. The process will then proceed to the operations necessary to complete a base line pass, step 107, as set forth in detail in FIG. 6 to be subsequently described. Here again upon the completion of the base line pass or if no base line pass is required, the operation proceeds to decision step 108 where a determination is made as to whether there are any overstrikes requiring an overstrike pass. If an overstrike pass is required, the process branches, step 109, to the overstrike pass operations described in FIG. 7. Upon the completion of these operations or if no overstrike pass is required, the process proceeds to decision step 110 where a determination is made as to whether there is any underlining requiring an underline pass. If such an underline pass is required, the process then, step 111, goes to the underline pass procedure to be subsequently described with respect to FIG. 8. Upon the completion of the underline pass procedure or if such a procedure is not required, the process then goes to decision step 112 where a determination is made as to whether there is any subscript requirement or pass. If such a pass is required, then the procedure, step 113, goes to the routine subsequently to be described with respect to FIG. 9 of completing a subscript pass. Upon the completion of such a subscript pass or if no such subscript pass is required, the operations for the particular line have been completed.

At this point, a plurality of passes, five or less, required to print the particular line being printed are now completed, and the operation, step 114, proceeds to the end of line routine shown in FIG. 13. In the end of line routine, step 115, RAM output buffer 75 (FIG. 2) is set equal to the beginning of the next line. Then, step 116, a start line pitch value is set equal to the current pitch value in current pitch value register 70. The end of line routine is thus completed and the operation is returned.

Figure 5:
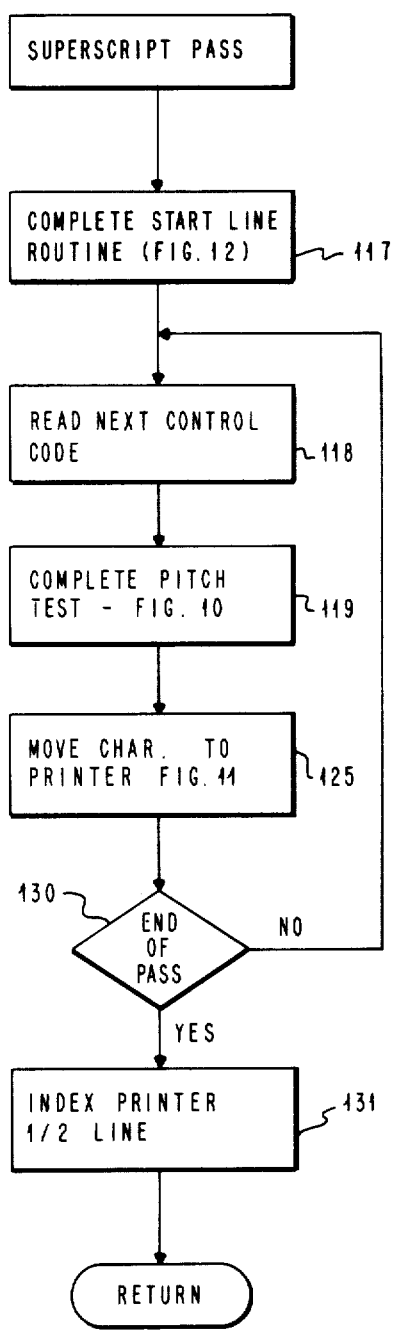
FIGS. 5-9 are flow charts respectively describing the operations on each of the five possible passes to print a line: superscript, base line, overstrike, underscore and subscript passes.

We will now proceed to describe the operations taking place in each of the five possible passes. First, if a superscript pass is required, operations described in the flow chart of FIG. 5 are carried out under the control of the superscript processor 79 in FIG. 3. First, on this pass and on everyone of the subsequent four passes, the start line routine of FIG. 12 is carried out, step 117. The significance of this step 117 is that irrespective of whatever change may have taken place on a previous one of the five passes in a given line formation, the pitch of the next pass is always set back at its original "start of line" value. Then, the next control code, step 118 is read from output buffer 75 (FIG. 2) by the superscript processor 79 (FIG. 3) of printer line processor unit 76 (FIG. 2). By control code, we mean the code indicating formatting information as distinguished from a character code indicative of the characters to be printed which will succeed the control code.

Figure 10:
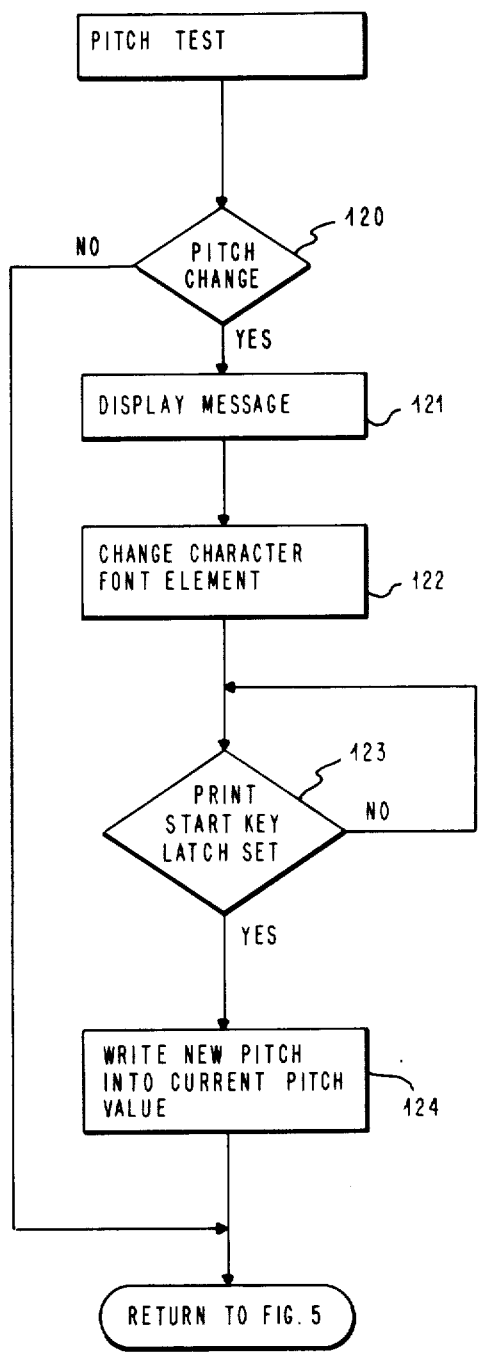
FIG. 10 is a flow chart of the operations involved in the pitch test routine used to determine pitch.

At this point, the pitch test is completed, step 119, following the operations set forth in FIG. 10; these operations are carried out under the control of the pitch test logic 84 (FIG. 3) in the printer line processor unit 76 (FIG. 2). First, decision step 120 (FIG. 10), a determination is made as to whether control codes indicate a pitch change. If there is no pitch change, the process is returned to the superscript pass operation of FIG. 5. If there is a pitch change, then, in the present embodiment a message indicative of such a change is displayed to the operator, step 121. This is carried out by pitch test logic 84 (FIG. 3) accessing the display message services logic 86 (FIG. 2) through the message access method block 87. The message services logic 86 communicate through the display access method program block 24 and display refresh buffer 88 to display terminal 14 in FIG. 2 to display the message in the conventional manner. The message to the operator indicates that the operator should change the character font element i.e., disk 202, FIG. 16 on the printer 10 to the element containing character font having the pitch change. The operator then proceeds, step 122, to change the character font element. In the mean time, the operation awaits an indication, decision step 123 (FIG. 10), that a start key latch 8 (FIG. 2) has been set. This setting of the start key latch 8 indicates the requested change in the character font element has been completed and that printing may resume. The status of the start key latch 8 is maintained in print start key latch register 89 (FIG. 2). When a determination is made in step 123 that start key latch 8 has been set, a new pitch is written into the current pitch value register 70 (FIG. 2), step 124.

At this point, the operation is returned to the operations of FIG. 5 and the next character is moved to the printer 10 so that it may be printed, step 125 (FIG. 5). The "move character to printer" procedure of step 125 (FIG. 5) is described in detail with reference to FIG. 11. The character is sent, step 126, through the printer interface 77 while, step 127, the current pitch value in register 70 is read. In response to this pitch value, the carrier 201, FIG. 16 on the printer 10 together with the character font element is moved horizontally step 128 for a distance reflective of this pitch value so that the character may be printed at the appropriate horizontal position along the print line during this pass under the control of move character logic 85, FIG. 3. At this point the operation is returned to the procedure of FIG. 5 where a determination is made, decision step 130, as to whether the pass is at an end. If it is not, then the operation is returned to step 118 and the next control code read. If we are at the end of the superscript pass, then, the printer 10 is indexed one-half line, step 131, and the superscript pass is completed.

Figure 6:
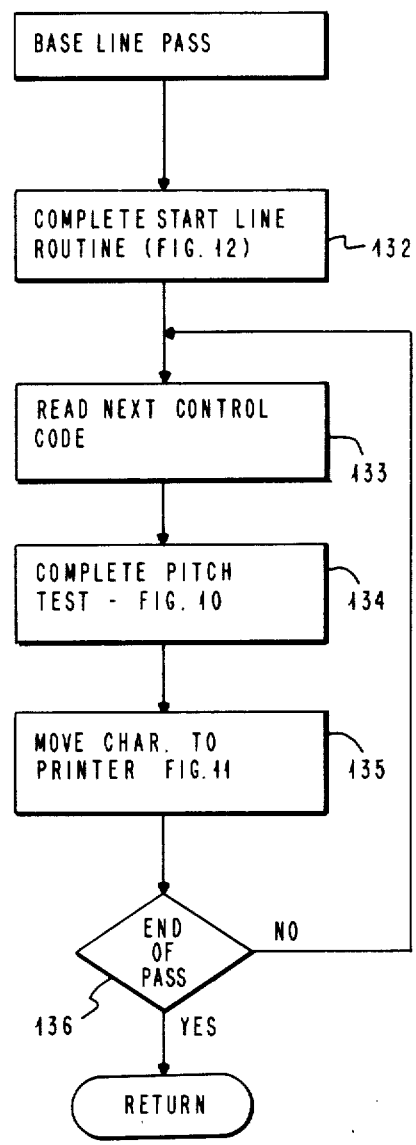

The next pass is the base line pass which is carried out under the control of the base line processor 82 (FIG. 3) of the printer line processor unit 76. The operations of the base line pass which are shown in FIG. 6 are substantially the same as those in the subscript pass except that in this second pass, the alphanumeric characters which make up the primary composition of the line are printed. Steps 132-136 of the operation of FIG. 6 are respectively the same as steps 117, 118, 119, 125 and 130 of the operations in FIG. 5. The only difference is that at the end of the base line pass in FIG. 6, the printer 10 is not indexed.

Figure 7:
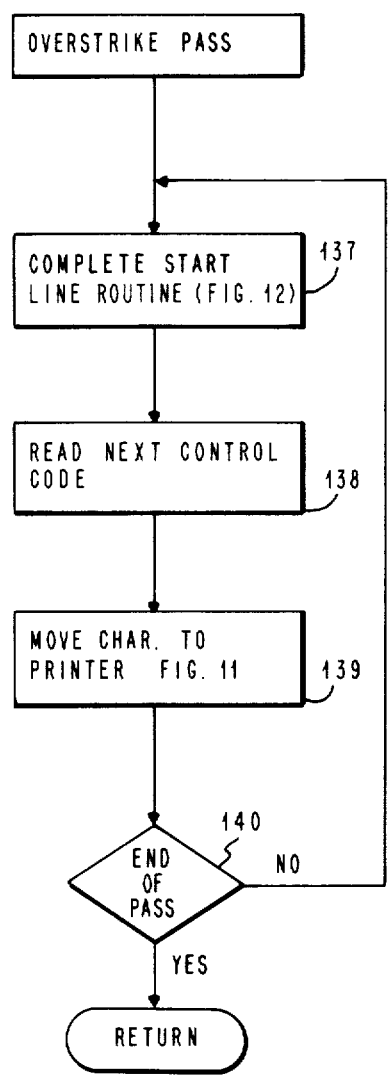

Next, the third or overstrike pass shown in the flow chart of FIG. 7 is carried out under the control of the overstrike processor 80 (FIG. 3). This overstrike pass is substantially the same as the base line pass of FIG. 6 with step 137 being the same as step 132, step 138 the same as step 133, step 139 the same as step 135 and step 140 the same as step 136. The only difference in these procedures is that no pitch test is carried out. We have indicated hereinabove that there is no change of pitch during an overstrike, i.e., the overstrike has only a single pitch irrespective of the pitch or changes in pitch of the base line characters being overstruck.

Figure 8:
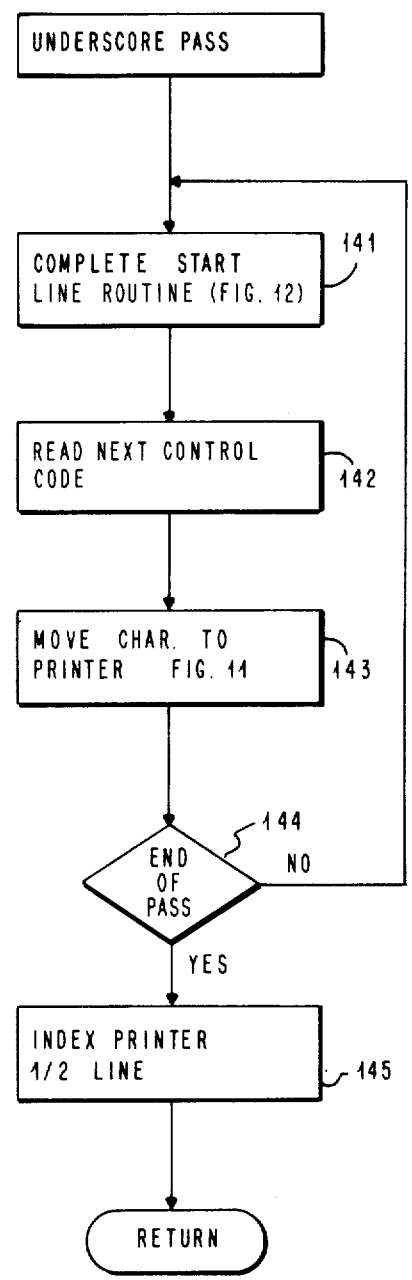

Upon the completion of the overstrike pass, the operations involved in the underscore pass as set forth in flow chart of FIG. 8 are carried out under the control of the underscore processor 83 (FIG. 3). This underscore pass has substantially the same steps as the overstrike pass of FIG. 7, with step 141 being the equivalent of step 137, step 142 the equivalent of step 138, step 143 the equivalent of step 139, and step 144 the equivalent of step 140. The only difference between the operations in FIG. 7 and FIG. 8 is that at the end of the underscore pass in FIG. 8, the printer 10 is indexed one-half line, step 145. Here again in the underscore pass, no pitch test is necessary. As stated hereinabove, the underscore is of a single pitch carried out with overlapping characters so as to make a continuous underscore line unaffected by variations in the pitch of the characters being underscored or underlined.

Figure 9:
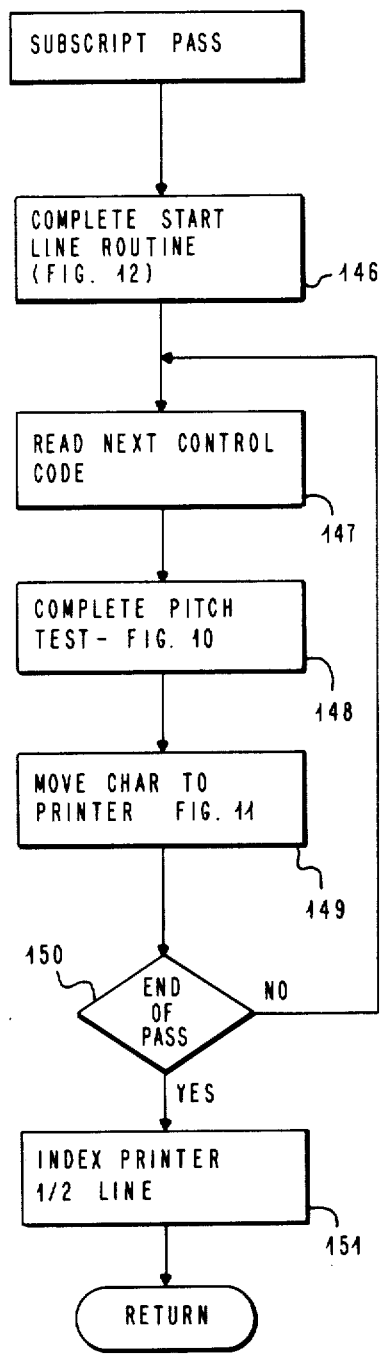

The final or subscript pass, the operations of which are shown in FIG. 9 is carried out under the control of the subscript processor 81 (FIG. 3). The steps of this subscript pass of FIG. 9 are substantially the same as the steps in the superscript pass previously described with respect to FIG. 5; step 146 is the equivalent of step 117, step 147 is the equivalent to step 118, step 148 is the equivalent to step 119, step 149 is the equivalent to step 125, step 150 is the equivalent to step 130 and step 151 is the equivalent to step 131.

Upon the completion of the subscript pass, the operation is returned to step 114 of FIG. 4 and the end of line routine previously described with respect to FIG. 13 is carried out.

While the invention has been particularly shown and described with reference to a preferred embodiment it will be understood by those skilled in the art that various other changes in form and detail may be made without departing from the spirit and scope of the invention.

We claim:

1. In an impact printer system having means for receiving a selected one of a plurality of character font elements having character fonts, the pitch of the character fonts of said elements being different from each other, means for selectively impacting selected characters from said respective fonts along lines in a document and means for controlling the selection of font elements and characters to provide a selected document format, the improvement wherein said controlling means includes means for controlling printing with at least two font elements of different pitch along a single line, said printing controlling means further including means for receiving format data including a specified pitch value and character data including the selected characters for impacting, pitch register means for storing the specified pitch value, means for providing said character data and said pitch value in said pitch register means to said impacting means, and test means for determining when said format data includes a change in pitch value and for stopping said character data and said pitch value from said pitch register means from being provided to the impacting means until the test means has stored said changed pitch value in said pitch register means.

2. In an impact printer system having carrier means for receiving a selected one of a plurality of character font elements having character fonts, the pitch of the character fonts of said elements being different from each other, means for moving said carrier means linearly across a document being printed on, means for selecting characters in a received font element to be printed at a respective linear position, means for impacting said selected character upon said document at said position to form printed lines and means for controlling the selection of font elements and font characters to provide a selected document format, the improvement wherein said controlling means includes means for controlling printined with at least two font elements of different pitch along a single printed line, said printing controlling means further including means for receiving format data including a specified pitch value and character data including the selected characters for impacting, pitch register means for storing the specified pitch value, means for providing said character data and said pitch value in said pitch register means to said impacting means, and test means for determining when said format data includes a change in pitch value and for stopping said character data and said pitch value from said pitch register means from being provided to the impacting means until the test means has stored said changed pitch value in said pitch register means.

3. The printer system of claim 2 wherein a printed line is formed by moving said carrier means for a plurality of passes across said document.

4. The printer system of claim 3 wherein said printer system includes means for printing underlines beneath selected characters on a different pass from the pass for printing said selected characters, and said underlines being printed by impacting a line character in a sequence of overlapping positions.

5. The printer system of claim 3 wherein said printer system includes means for overstriking a sequence of underlying selected characters on a selected line, said overstriking being printed by impacting an overstrike character in a sequence of positions over said selected underlying characters and said overstrike characters being printed in a single pitch whereby said overstrike characters are not in coincidence with underlying characters printed in a different pitch.

6. The printer system of claim 3 wherein the respective printing with each of said two font elements of different pitch is done on a different pass from the printing with the other of said two font elements.

7. In a word processing system having an interactive display terminal, a printer subsystem including means for receiving a selected one of a plurality of character font elements having character fonts, the pitch of the character font elements being different from each other, means for selectively impacting selected characters from said respective character font elements along lines in a document, and means for controlling the selection of font elements and characters to provide a selected document format, the improvement wherein said controlling means includes means for controlling printing with at least two font elements of different pitch along a single line, said printing controlling means further including means for receiving format data including a specified pitch value and character data including the selected characters for impacting, pitch register means for storing the specified pitch value, means for providing said character data and said pitch value in said pitch register means to said impacting means, and test means for determining when said format data includes a change in pitch value and for stopping said character data and said pitch value from said pitch register means from being provided to the impacting means until the test means has stored said changed pitch value in said pitch register means.

8. The word processing system of claim 7 wherein said controlling means further includes means for displaying on said terminal a message indicating to the operator that a change from one of said two font elements to the other must be made.

9. An impact printing system comprising:
means for receiving information to be printed upon a document including designation of selected ones of a plurality of character font elements having character fonts, at least one of said character font elements including character fonts of a unique pitch;
means for selectively impacting selected characters from said selected fonts on lines of said document; and
means for controlling the selection of font elements and characters to provide a format for said document including means for controlling printing with at least two font elements of different pitch along a single printed line, said printing controlling means further including means for receiving format data from said means for receiving information, said format data including a specified pitch value and character data including the selected characters for impacting, pitch register means for storing the specified pitch value, means for providing said character data and said pitch value in said pitch register means to said impacting means, and test means for determining when said format data includes a change in pitch value and for stopping said character data and said pitch value from said pitch register means from being provided to the impacting means until the test means has stored said changed pitch value in said pitch register means.

10. An impact printing system according to claim 9 wherein said controlling means includes means for causing the impacting means to impact said selected characters on a line in multiple passes.

11. An impact printing system according to claim 10 wherein said multiple pass means includes means for having the selected characters to be impacted on each pass with a font element of different character font pitch from a font element of a previous pass.

12. An impact printing system according to claim 11 wherein said multiple pass means further includes means for having said characters impacted along a single pass with at least two font elements of different character font pitch.

13. A word processing system comprising:
an operator input means for inputting text information to be printed upon a document and command information including designations of selected ones of a plurality of character font elements having character fonts, at least one of said character fonts of said elements having a unique pitch;
a display means for displaying information to the operator;
an impact printer including the plurality of character font elements and having means for selectively impacting selected characters from selected fonts for printing the test information on the document; and
processing means connected to the input means, display means and printer for receiving said information and for controlling the selection of font elements and characters to provide a format for said document including means for controlling printing with at least two font elements of different pitch along a single printed line, said printing controlling means further including means for receiving format data from said text information, said format data including a specified pitch value and character data including the selected characters for impacting, pitch register means for storing the specified pitch value, means for providing said character data and said pitch value in said pitch register means to said impact printer, and test means for determining when said format data includes a change in pitch value and for stopping said character data and said pitch value from said pitch register means from being provided to the impact printer until the test means has stored said changed pitch value in said pitch register means.

* * * * *

UNITED STATES PATENT AND TRADEMARK OFFICE
CERTIFICATE OF CORRECTION

PATENT NO. : 4,624,591
DATED : November 25, 1986
INVENTOR(S) : J. G. Barnes et al It is certified that error appears in the above—identified patent and that said Letters Patent is hereby corrected as shown below:

Column 10, line 37 "printined" should read --printing--.

Column 12, line 36 "test" should read --text--.

Signed and Sealed this

Third Day of March, 1987

Attest:

DONALD J. QUIGG

Attesting Officer

Commissioner of Patents and Trademarks